(12) United States Patent
Eskridge, Jr. et al.

(10) Patent No.: US 11,923,955 B2
(45) Date of Patent: Mar. 5, 2024

(54) UNIFIED RADIO SOLUTION

(71) Applicant: SMARTSKY NETWORKS LLC, Morrisville, NC (US)

(72) Inventors: Elbert Stanford Eskridge, Jr., Chapel Hill, NC (US); Bruce J. Holmes, Williamsburg, VA (US); Gerard James Hayes, Wake Forest, NC (US); James Evans Ladd, Jr., Hillsborough, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 293 days.

(21) Appl. No.: 17/605,832

(22) PCT Filed: Apr. 23, 2020

(86) PCT No.: PCT/US2020/029473
§ 371 (c)(1),
(2) Date: Oct. 22, 2021

(87) PCT Pub. No.: WO2020/219644
PCT Pub. Date: Oct. 29, 2020

(65) Prior Publication Data
US 2022/0209847 A1  Jun. 30, 2022

Related U.S. Application Data

(60) Provisional application No. 62/837,816, filed on Apr. 24, 2019.

(51) Int. Cl.
*H04B 7/185* (2006.01)

(52) U.S. Cl.
CPC ..... *H04B 7/18504* (2013.01); *H04B 7/18506* (2013.01)

(58) Field of Classification Search
CPC ............ H04B 7/18504; H04B 7/18506; H04B 7/155; H04B 7/15521; H04B 7/1555; H04B 7/15542
See application file for complete search history.

(56) References Cited

U.S. PATENT DOCUMENTS

| 7,640,016 | B2 | 12/2009 | Cruz et al. | |
| 11,197,168 | B2 * | 12/2021 | Zavesky | ............ H04B 7/18506 |

(Continued)

FOREIGN PATENT DOCUMENTS

| EP | 3582407 A1 | 12/2019 |
| WO | 2019060350 A1 | 3/2019 |

OTHER PUBLICATIONS

International Search Report and Written Opinion of International Application No. PCT/US20/29473 dated Aug. 17, 2020, all pages cited in its entirety.

*Primary Examiner* — Khanh C Tran
(74) *Attorney, Agent, or Firm* — Burr & Forman LLP

(57) ABSTRACT

A unified radio system for providing wireless communication to a communication device on an aircraft regardless of aircraft altitude may include a terrestrial network including a plurality of terrestrial base stations configured to communicate primarily in a ground communication layer below a first altitude, an ATG network including a plurality of ATG base stations configured to communicate primarily in an ATG communication layer above a second altitude, an air-to-air mesh network for data relays through connected aircraft, and an aircraft with an onboard antenna assembly and a unified radio. The unified radio may be configured to monitor network parameters of the terrestrial network and the ATG network and switch between a currently serving network and a non-serving network based on the network parameters.

21 Claims, 5 Drawing Sheets

(56) References Cited

U.S. PATENT DOCUMENTS

2014/0136658 A1   5/2014  Wahler
2016/0205560 A1*  7/2016  Hyslop ................ H04W 16/02
                                                          455/454
2018/0241463 A1*  8/2018  Lu ....................... H04W 36/32

* cited by examiner

UNIFIED RADIO SOLUTION

CROSS REFERENCE TO RELATED APPLICATIONS

This application claims priority to U.S. application No. 62/837,816 filed on Apr. 24, 2019, the entire contents of which are hereby incorporated by reference in its entirety.

TECHNICAL FIELD

Example embodiments generally relate to wireless communications and, more particularly, relate to techniques for enabling optimal and seamless connectivity for aircraft (and devices thereon) at all elevations and geographical locations via a single, multimodal radio solution.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As urban and regional air mobility, and other modes of air travel increase, the accessibility and integration of air mobility into the public consciousness will undoubtedly increase. With increased usage, both the public users of air travel platforms, and the platforms themselves (and equipment thereon) will have increased communications needs. However, separate aviation network operators typically exist for operations in various different geographies and elevations. Thus, it is generally not possible to have one device stay connected to one network throughout a journey of nearly any kind without sacrificing substantially in terms of latency or cost.

Additional complications arise in aviation when each unique procedure or operation in a particular portion of airspace requires different radio systems for communications, navigation, or surveillance. The term, "Mixed Equipage" is used to describe the situation involving differing radio systems requirements by aircraft type and by airspace operational requirements. Radio systems that provide more integrated solutions for these functions, that could be implemented across more aircraft types, operating in more kinds of airspace, hold the potential for increased airspace efficiency, with reduced costs for operators.

BRIEF SUMMARY OF SOME EXAMPLES

Some example embodiments may provide a system in which coverage provided by terrestrial networks, satellite networks, air-to-ground (ATG) networks, air-to-air (ATA or V2V), and any other applicable networks can not only coexist in the same geographical area, but can be leveraged to ensure reliable, optimized and continuous communications regardless of location and elevation.

In one example embodiment, a unified radio system for providing wireless communication to a communication device on an aircraft regardless of aircraft altitude may include a terrestrial network including a plurality of terrestrial base stations configured to communicate primarily in a ground communication layer below a first altitude, an ATG network including a plurality of ATG base stations configured to communicate primarily in an ATG communication layer above a second altitude, and an aircraft with an onboard antenna assembly and a unified radio. The unified radio may be configured to monitor network parameters of the terrestrial network and the ATG network and switch between a currently serving network and a non-serving network based on the network parameters.

In another example embodiment, a unified radio for providing wireless communication to a communication device on an aircraft regardless of aircraft altitude is provided. The unified radio may include an antenna assembly configurable to facilitate communication with a terrestrial network comprising a plurality of terrestrial base stations configured to communicate primarily in a ground communication layer below a first altitude, and an air-to-ground (ATG) network comprising a plurality of ATG base stations configured to communicate primarily in an ATG communication layer above a second altitude. The unified radio also includes processing circuitry configured to monitor network parameters of the terrestrial network and the ATG network and switch between a currently serving network and a non-serving network based on the network parameters.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
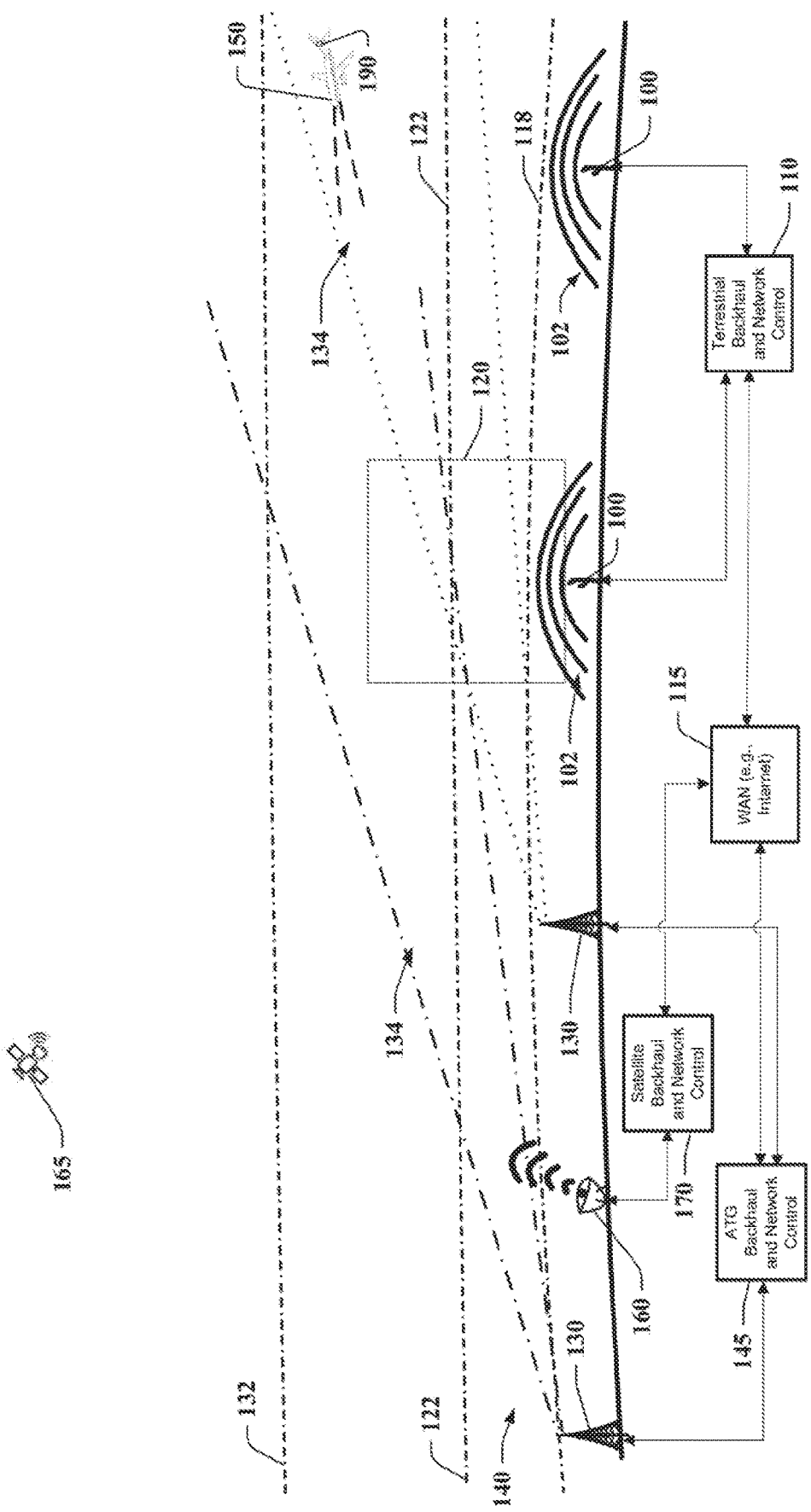
FIG. 1 illustrates a side view of an example network deployment providing multiple networks for which a multimodal radio system may intelligently provide connectivity in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide a system, architectures and/or methods for improved aviation-related communication network (e.g., satellite network, air-to-ground (ATG) network, air-to-air (ATA or V2V) network, or hybrid network) performance. In this regard, some example embodiments may provide a unified radio system that can provide optimal and seamless connectivity for aircraft (and devices thereon) at all elevations and at all geographic locations within the context of aviation-related network communication. In this regard, example embodiments may enable a communication device onboard an aircraft (e.g., aircraft communication equipment or passenger communication equipment) to switch between available networks to ensure continuous connectivity. Moreover, the continuous connectivity may be managed in order to maximize performance (e.g., reduced latency, optimal signal strength and reliability) and minimizing cost.

FIG. 1 illustrates a side view of an area in which example embodiments may be practiced. Although FIG. 1 shows only two dimensions (e.g., an X direction in the horizontal plane and a Z direction in the vertical plane), it should be appreciated that the devices and components illustrated are also configured to communicate and radiate in directions into and out of the page (i.e., in the Y direction). It should also be noted that FIG. 1 is not drawn to scale. Thus, it should be appreciated that the shapes of cells generated by the base stations for the various network architectures shown may be exaggerated to some degree to facilitate ease of description. For example, the ATG base stations of some embodiments may be configured to have a much longer horizontal component (e.g., dozens to perhaps more than 100 miles) than vertical component (typically less than about 8 miles or about 45,000 ft) to their respective cell architectures. Moreover, the satellites are actually much farther distant than represented in FIG. 1 and other inaccuracies may also exist. Thus, again, FIG. 1 should be appreciated as a non-limiting tool by which to facilitate discussion of the topics described herein.

As shown in FIG. 1, a terrestrial network component of the architecture may include one or more terrestrial base stations 100. The terrestrial base stations 100 may generally transmit terrestrial network emissions 102 to serve various fixed or mobile communication nodes (e.g., UEs) and other wireless communication devices dispersed on the ground. The terrestrial base stations 100 may be operably coupled to terrestrial backhaul and network control components 110, which may coordinate and/or control operation of the terrestrial network. The terrestrial backhaul and network control components 110 may generally control allocation of RF spectrum and system resources, and provide routing and control services to enable the UEs and other wireless communication devices of the terrestrial network to communicate with each other and/or with a wide area network (WAN) 115 such as the Internet.

The terrestrial base stations 100 are generally configured to transmit in an omnidirectional pattern around each respective one of the terrestrial base stations in the X-Y plane. However, the terrestrial base stations 100 generally also include at least some coverage in the Z direction (i.e., in altitude). A theoretical terrestrial network altitude limit 118 is shown in FIG. 1 to mark a limit above which the terrestrial network emissions 102 are generally not reliable for generation of sufficient signal strength and continuity to enable continuous connectivity to UEs or aircraft. The theoretical terrestrial network altitude limit 118 may be considered to be about 5,000 feet. However, this value may change in certain areas and dependent upon the proximity to one of the terrestrial base stations 100 and the existence of physical structures in the area.

In some cases, certain ones of the terrestrial base stations 100 may be augmented with cells that are configured to provide coverage at higher elevations than the theoretical terrestrial network altitude limit 118. However, such cells could also be free standing, or exist at certain specified geographic locations (e.g., airports or ports associated with urban air mobility options). For example, "sky cells" or vertically oriented terrestrial network cells 120 that are aimed upwardly may exist to augment terrestrial network coverage in the Z direction. The vertically oriented terrestrial network cells 120 may define cylindrical or conical shaped cells that extend upwardly from the corresponding ones of the terrestrial base stations 100. The vertically oriented terrestrial network cells 120 may therefore extend above the theoretical terrestrial network altitude limit 118 and also above a theoretical ATG network altitude limit 122, which may be at about 10,000 feet.

The UEs of the terrestrial network may also transmit their own terrestrial network emissions, which may create the possibility for generation of a substantial amount of communication traffic in a ground communication layer extending from the ground to theoretical terrestrial network altitude limit 118. Thus, a UE that is configured to operate in the terrestrial network would not be able to reliably receive communications when operating above the theoretical terrestrial network altitude limit 118, except in the presence of (and while in the coverage area defined by) one of the vertically oriented terrestrial network cells 120.

Meanwhile, a plurality of ATG base stations 130 of an ATG network may be deployed in the same region to define an ATG coverage area generally above the theoretical ATG network altitude limit 122 and up to a predetermined maximum altitude 132 of about 40,000 to 45,000 feet. In an example embodiment, each of the ATG base stations 130 may generate a wedge-shaped cell 134 that extends from a corresponding one of the ATG base stations 130 toward an area above the horizon in a particular direction. In this regard, the ATG base stations 130 may each project a directional radiation pattern that is oriented in a first direction (mainly in the X-Y plane, but expanding in the Z direction as distance from the ATG base station 130 increases) to define a wedge shape, with an apex of the wedge originating at the ATG base station 130. The ATG base stations 130 may be arrayed along the first direction so that the wedge-shaped cells 134 overlap each other to provide continuous coverage between the minimum altitude defined at the theoretical ATG network altitude limit 122 and the predetermined maximum altitude 132.

The architecture of the ATG network may provide that the wedge-shaped cells 134 may be layered on top each other to define a continuous area where coverage can be provided by enabling handovers between adjacent cells (i.e., overlapping on top of each other). When an in-flight aircraft 150 is exclusively a first one of the wedge shaped cells 134, the aircraft 150 may communicate with the first one of the wedge shaped cells 134 using assigned RF spectrum and when the aircraft 150 is exclusively in a second one of the wedge shaped cells 134, the aircraft 150 may communicate with the second one of the wedge shaped cells 134 using assigned RF spectrum. An area of overlap between the first and second ones of the wedge-shaped cells 134 may provide the opportunity for handover of the aircraft 150 between corresponding first and second ones of the ATG base stations 130, respectively. Accordingly, uninterrupted handover of receivers or communication devices on the aircraft 150 may be provided while passing between coverage areas of base stations having overlapping coverage areas as described herein.

In an example embodiment, ATG backhaul and network control components 145 may be operably coupled to the first and second ones of the ATG base stations 130. The ATG backhaul and network control components 145 may generally control allocation of RF spectrum and system resources, and provide routing and control services to enable the aircraft 150 and any UEs and other wireless communication devices thereon to communicate with each other and/or with the WAN 115 such as the Internet.

Given the curvature of the earth and the distances between base stations of the ATG network, the layering of the wedge-shaped cells 134 can be enhanced. Additionally, the ATG base stations 130 may be configured to communicate with the aircraft 150 (or devices thereon) using relatively small, directed beams that are generated using beamforming techniques. The beamforming techniques employed may include the generation of relatively narrow and focused beams. Thus, the generation of side lobes (e.g., radiation emissions in directions other than in the direction of the main beam) that may cause interference with communications in the ground communication layer may be reduced.

Accordingly, the network architecture itself may help to reduce the amount of cross-layer interference. In this regard, the wedge-shaped cell structure focuses energy just above the horizon and leaves a layer on the ground that is usable for terrestrial network operations without significant interference from the ATG base stations and create a separate higher altitude layer for ATG network communications. Additionally, the use of directional antennas with beam steering by the ATG base stations 130, and antennas with side lobe suppression, may reduce the amount of interference across these layers.

In some embodiments, the area defined between the minimum altitude defined at the theoretical ATG network altitude limit 122 and the predetermined maximum altitude 132 may be referred to as an ATG communication layer. As can be appreciated from the descriptions above, and from FIG. 1, the ATG communication layer and the ground communication layer may not necessarily overlap, much less be continuous with each other in elevation or altitude. Thus, a gap region 140 may exist therebetween. When the aircraft 150 that is located in the ATG communication layer, the aircraft 150 may reasonably expect (for its own communication equipment and UEs or other communication devices thereon) to receive continuous and quality service from the ATG base stations 130. Similarly, when the aircraft 150 is on the ground or otherwise in the ground communication layer, it may be expected that the aircraft 150 (and any communication equipment or UEs thereon) will receive continuous and quality service from the terrestrial base stations 100. However, the gap region 140 may define an area of uncertainty for coverage.

In some cases, the gap region 140 may be bridged by the vertically oriented terrestrial network cells 120, where such cells exist. Thus, as noted above, for areas such as airports or urban air mobility ports, where transitions between the ATG communication layer and the ground communication layer are expected, the vertically oriented terrestrial network cells 120 may be purposely located to provide an option for connectivity in the gap region 140. However, in some cases, the vertically oriented terrestrial network cells 120 may not be continuously provided at all geographical locations. Instead, as noted above, since the vertically oriented terrestrial network cells 120 may be concentrated around airports or urban areas there may be other areas where no such options for coverage exist. In the absence of (and sometimes in the presence of) the vertically oriented terrestrial network cells 120 there may be a couple of options to extend coverage into the gap region 140. Moreover, it may also be desirable to define backup communication options in some of the regions (e.g., the gap region 140, the ATG communication layer and the ground communication layer). The same options may be applicable for gap filling and/or redundancy provision.

In this regard, options for gap filling and/or redundancy provision may include satellite communication networks and either or both of the ATG base stations 130 and the terrestrial base stations 100 to the extent they achieve coverage outside expected areas. With respect to satellite communication networks, FIG. 1 illustrates a ground station 160 and a satellite 165. However, it should be appreciated that the satellite communications network may include multiple instances of each of these components. The satellite communication network may also include satellite backhaul and network control components 170 that may be operably coupled to each of the ground stations 160 and generally control allocation of RF spectrum and system resources, and provide routing and control services to enable the aircraft 150 and any UEs and other wireless communication devices thereon to communicate with each other and/or with the WAN 115 such as the Internet.

The satellite communication network may, due to its structure of aiming downward with satellites 165 from positions in orbit over the earth, provide opportunities for backup coverage in the ground communication layer, the gap region 140 and the ATG communication layer. Moreover, the satellite communication network may be a good option for primary communication provision in the gap region 140. However, the cost of satellite communication network antennas for aircraft are extremely high (often nearly $200,000 and in excess of $300,000 when installation and service are considered). Additionally, satellite communication networks suffer excessively from high latency. The latency problem generally makes satellite communication networks ineffective for applications or services that require high bandwidth for both uplink and downlink directions. In effect, satellite communication networks are useful only for one-way (i.e., downlink) communications where the high latency involved is not impactful. Thus, although satellite communication networks may be a reliable backup communication option, or gap filler, the high latency and cost generally weighs heavily against their usage when other options are available.

Meanwhile, as can be appreciated from the descriptions above, and from FIG. 1, both the ATG base stations 130 and the terrestrial base stations 100 may have the ability to provide coverage outside of the normally expected regions of coverage associated with the wedge shaped cells 134 and the terrestrial network emissions 102 shown in FIG. 1. Thus, there may be certain areas where coverage can be provided by the ATG base stations 130 via the wedge-shaped cells 134 below the theoretical ATG network altitude limit 122. Similarly, there may be certain areas where coverage can be provided by the terrestrial base stations 100 outside the nominal coverage areas of the terrestrial network emissions 102, and therefore above the theoretical terrestrial network altitude limit 118. These areas may be known, or knowable, and may or may not be dependent upon time, season, weather, or other factors. However, in other cases, the areas may be detected in situ and resource allocation of radio resources could be automatically managed to optimize the connectivity provided to the aircraft 150 and the communications equipment thereon.

Accordingly, it may be desirable to utilize a module or other network component that enables the aircraft 150 (or at least the communication equipment (e.g., UEs and on-board equipment) thereon) to transition between available networks in a way that provides a seamless connectivity experience for users, such "users" also including onboard sensors and systems. The provision of this level of connectivity over all altitudes that the aircraft 150 may operate within may be referred to as a unified radio solution. The unified radio solution may, in fact, include a single radio that is configurable to be interoperable with multiple networks (selected for optimal performance), or may include multiple radios that are capable of working together to achieve the same result. For example, the unified radio solution may employ dynamic IP addressing (or other methods) to transfer a session between networks. Thus, from the perspective of the user, it may appear as though a unified radio can allow the user to connect while on the ground (directly or via on-board WiFi) and maintain the same session as the user ascends to any altitude and then later descends to land at another location. Although the unified radio may transition between networks to maintain the sessions for each user, the user may experience little or no change as a result. Regardless of specific form, the equipment on the aircraft side (or in any communication equipment or UE that is itself configured to operate in the unified radio solution) may be referred to as a unified radio 190. The unified radio 190 is shown on the aircraft 150 in FIG. 1 and, in some cases, the unified radio 190 may be able to operate alone to achieve the results desired. However, in some cases, addition network or on-board components may enhance operations in certain ways that will be described in greater detail below.

Figure 2:
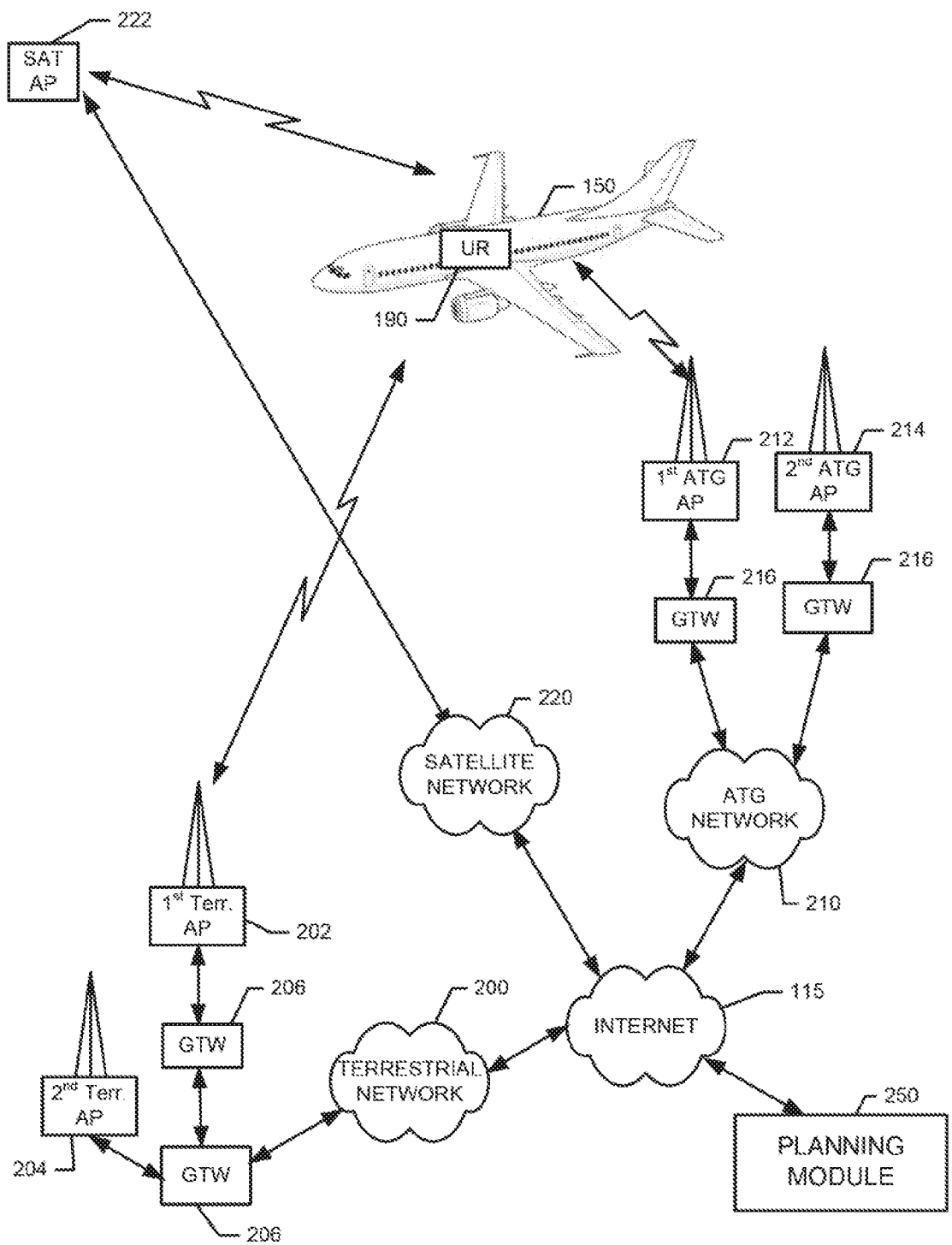
FIG. 2 illustrates a block diagram of a unified radio solution in accordance with an example embodiment.

FIG. 2 illustrates a block diagram of various components of networks that may be employed in the context of a unified radio solution according to an example embodiment. In this regard, as shown in FIG. 2, a terrestrial network 200, an ATG network 210 and a satellite network 220 are each represented.

As shown in FIG. 2, each of the wireless networks may include wireless access points (APs) that include antennas configured for wireless communication. Thus, for example, the terrestrial network 200 may include a first terrestrial AP 202 and a second terrestrial AP 204, each of which may be base stations, among a plurality of geographically distributed base stations that combine to define the coverage area for the terrestrial network 200. The first and second terrestrial APs 202 and 204 may each be examples of the terrestrial base stations 100 of FIG. 1. Thus, one, both or neither of the first and second terrestrial APs 202 and 204 may be configured to provide the vertically oriented terrestrial network cells 120 mentioned above in reference to FIG. 1. The first and second terrestrial APs 202 and 204 may each be in communication with the terrestrial network 200 via a gateway (GTW) device 206. The terrestrial network 200 may further be in communication with a wide area network such as the Internet 115, Virtual Private Networks (VPNs) or other communication networks. In some embodiments, the terrestrial network 200 may include or otherwise be coupled to a packet-switched core or other telecommunications network. Thus, for example, the terrestrial network 200 may be a cellular telephone network (e.g., a 4G, 5G, LTE or other such network).

The ATG network 210 may similarly include a first ATG AP 212 and a second ATG AP 214, each of which may be base stations, among a plurality of geographically distributed base stations that combine to define the coverage area for the ATG network 210. The first and second ATG APs 212 and 214 may each be examples of the ATG base stations 130 of FIG. 1. The first and second ATG APs 212 and 214 may each be in communication with the ATG network 210 via a GTW device 216. The ATG network 210 may also be in communication with a wide area network such as the Internet 115, VPNs or other communication networks. In some embodiments, the ATG network 210 may also include or otherwise be coupled to a packet-switched core or other telecommunications network. Thus, for example, the ATG network 210 may be a network that is configured to provide wireless communication to airborne assets and may employ 4G, 5G, LTE and/or other proprietary technologies.

The satellite network 220 may include one or more ground stations (e.g., ground station 160 of FIG. 1) and one or more satellite access points 222 (e.g., satellite 165 of FIG. 1). The satellite network 220 may employ Ka band, Ku band, or any other suitable satellite frequencies/technologies to provide wireless voice and data communication services to the aircraft 150, and more specifically to the unified radio 190 on the aircraft 150.

As shown in FIG. 2, a planning module 250 may be disposed at a location accessible to one or more of the networks and/or the unified radio 190. The planning module 250 may be configured to gather, store and/or update information that may be useable by the unified radio 190 and/or other network components in order to provide the unified radio solution described herein. The planning module 250 may, in some cases, be part of a specific one of the networks or may be accessible to any one of the networks and devices operably coupled thereto via the Internet 115. In still other cases, the planning module 250 may be disposed at the aircraft 150, or at another device (e.g., a UE) implementing the unified radio 190.

Figure 3:
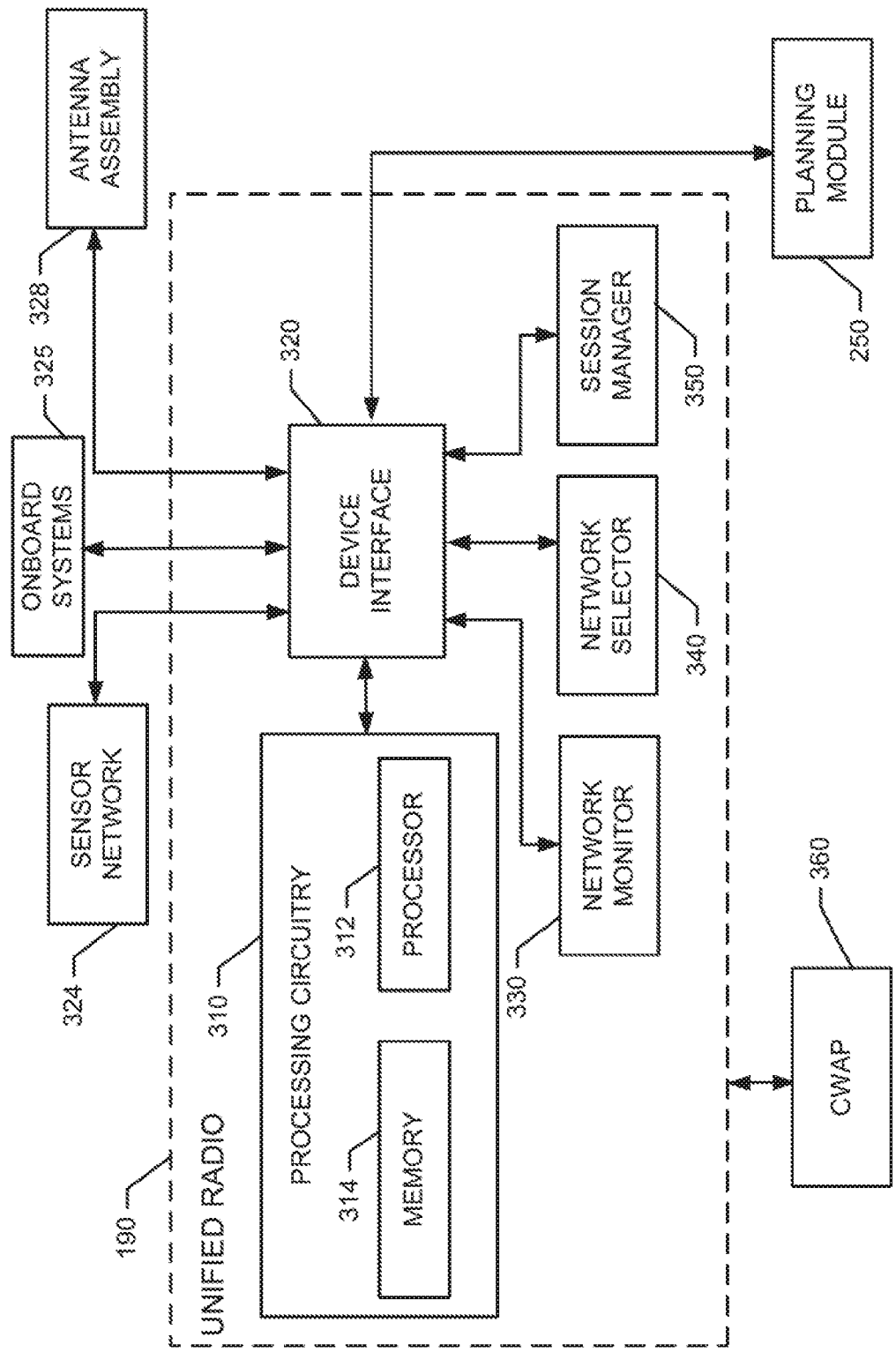
FIG. 3 illustrates a block diagram of various components of a unified radio in accordance with an example embodiment.

An example structure for the unified radio 190 of an example embodiment is shown in the block diagram of FIG. 3. In this regard, as shown in FIG. 3, the unified radio 190 may include processing circuitry 310 configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities, systems and/or sensors of the aircraft 150, e.g., via the device interface 320. Thus, for example, the processing circuitry 310 may communicate with a sensor network 324 or other onboard systems 325 of the aircraft 150 to receive altitude information, location information (e.g., GPS coordinates, latitude/longitude, etc.), pitch and roll information, and/or the like. The processing circuitry 310 may also communicate with an antenna assembly 328 to control the frequency and/or direction at which the antenna assembly 328 is configured to operate. Moreover, at least some of the information gathered or received from the sensor network 324 and/or the onboard systems 325 may be communicated off the aircraft 150 in real time due to the robust nature of the return link capability of the aircraft 150. Effectively, the processing circuitry 310 could act as a hub for collection and transmission of data regarding onboard systems or conductions to the ground. Thus, an airborne internet of things (TOT) network may be created and data communicated off the aircraft 150 may either live streamed or transmitted as bandwidth becomes available based on other communication loading. Some data (e.g., low priority data) could be stored (e.g., in the memory 314) for transmission off the aircraft 150 when the aircraft 150 has landed. However, higher priority information may be transmitted while inflight, and highest priority information may be live streamed off the aircraft 150 via the return link.

The device interface 320 may include one or more interface mechanisms for enabling communication with other devices (e.g., modules, entities, sensors and/or other components of the aircraft 150). In some cases, the device interface 320 may be any means such as a device or circuitry embodied in either hardware, or a combination of hardware and software that is configured to receive and/or transmit data from/to modules, entities, sensors and/or other components of the aircraft 150 that are in communication with the processing circuitry 310. In this regard, for example, the device interface 320 may be configured to operably couple the processing circuitry 310 to a network monitor 330, a network selector 340 and/or a session manager 350.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the network monitor 330, the network selector 340 and/or the session manager 350 based on inputs received by the processing circuitry 310 indicative of aircraft 150 altitude, location and/or the like. As such, in some embodiments, the processor 312 (or the processing circuitry 310) may be said to cause each of the operations described in connection with the network monitor 330, the network selector 340 and/or the session manager 350. The processor 312 may also control the antenna assembly 328 to tune the antenna assembly 328 to select a network identified by the network selector 340 in relation to adjustments to be made to antenna arrays to undertake the corresponding functionalities relating to array configuration based on execution of instructions or algorithms configuring the processor 312 (or processing circuitry 310) accordingly. In particular, the instructions may include instructions for processing 3D position information (e.g., altitude and location) the aircraft 150 (including orientation) in order to instruct an antenna array of the antenna assembly 328 to orient a beam or otherwise tune toward a frequency and/or a direction that will facilitate establishing a communication link between the antenna array and one of the APs of a selected one of the networks of FIGS. 1 and 2.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the antenna assembly 328 and/or the network monitor 330, the network selector 340 and/or the session manager 350 as described herein. In an example embodiment, the memory 314 may store or include information from the planning module 250, or the planning module 250 may be implemented at the aircraft 150 by storing instructions/code associated therewith in the memory 314 for execution at the processor 312. Otherwise, it should be appreciated that if the planning module 250 is physically located elsewhere in the system, the planning module 250 may be understood to include components similar in function and/or form to the processing circuitry 310, processor 312 and/or memory 314 described above.

The network monitor 330 may be configured to monitor network parameters for a currently serving network (i.e., a network with at least one active session with the unified radio 190 or devices served thereby), and from time-to-time at least one other, non-serving network (i.e., a network with which the unified radio 190 is configurable to communicate, but not actively conducting a session with presently). However, in some cases, the network monitor 330 may be configured to monitor network parameters for all available networks (e.g., the terrestrial network 200, the ATG network 210 and the satellite network 220). The network parameters monitored may include signal strength, a measure of interference levels, signal to noise ratio, and peak and/or average values of the preceding parameters over a given period of time. The network monitor 330 may, in some cases, work with the antenna assembly 328 configured to include an antenna array that can be configured to periodically or continuously sniff or otherwise monitor the parameters of the non-serving network. In embodiments where the monitoring is not continuous, a predefined period, or a series of event-based stimuli may be used to trigger the measurement of the network parameters. The event-based stimuli may include various altitude thresholds being passed or approached, or certain rates of altitude change being encountered, or the significance and priority of data being transmitted. In either case, the direction (ascending vs. descending) of altitude change may also be considered. Thus, for example, when the theoretical terrestrial network altitude limit 118 is being approached from above, it may be assumed that a switch to the terrestrial network 200 may soon be necessary. The proximity to the theoretical terrestrial network altitude limit 118 or rate of approach to the theoretical terrestrial network altitude limit 118 may therefore trigger a check of the network parameters of the terrestrial network 200 to determine if a switch from the ATG network 210 (which may be assumed to be the currently serving network for at least part of the approach). Meanwhile, if the direction of altitude change is reversed, and the aircraft 150 is ascending, the terrestrial network 200 may be the currently serving network and the ATG network 210 may be the non-serving network whose network parameters are measured responsive to approach to the theoretical terrestrial network altitude limit 118 in the ascending direction.

A similar situation may exist for the theoretical ATG network altitude limit 122. For example, proximity to the theoretical ATG network altitude limit 122 or rate of approach to the theoretical ATG network altitude limit 122 in the descending direction may trigger a check of the network parameters of the terrestrial network 200 to determine if a switch from the ATG network 210 (which may be assumed to be the currently serving network for at least part of the descent) is warranted. Meanwhile, if the direction of altitude change is reversed, and the aircraft 150 is ascending, the terrestrial network 200 may be the currently serving network and the ATG network 210 may be the non-serving network whose network parameters are measured responsive to approach to the theoretical ATG network altitude limit 122 in the ascending direction.

In some cases, frequency of monitoring may increase based on rate of ascent/descent or the current altitude. For example, when the aircraft 150 is in the gap region 140, the rate or frequency of monitoring may be maximized until the aircraft 150 steadies at altitude in a layer served by the terrestrial network 200 or the ATG network 210, respectively. Moreover, it should be understood that the network parameters of the satellite network 220 may be monitored additionally or alternatively in any of the situations described above.

When the network parameters for the non-serving network are measured, the network parameters may be communicated to the network selector 340 (along with network parameters for the currently serving network). The network selector 340 may be configured to employ network selection criteria to make a determination as to which network (i.e., the terrestrial network 200, the ATG network 210, or the satellite network 220) should be used for communication by the unified radio 190. In some cases, the same periodicity, frequency or stimuli used for measuring network parameters may be used to trigger network selection at the network selector 340. Thus, the network monitor 330 may send network parameter information After the determination is made, the network selector 340 may provide data on network parameters to the network selector 340, and the network selector 340 may use such information (with or without historical information) to determine a selection indication that is used to communicate to the antenna assembly 328 (e.g., by the processing circuitry 310) to configure an antenna array to switch to the network that has been selected as the new currently serving network. The prior currently serving network may then become the non-serving network, or one of the non-serving networks. Thus, for example, if the unified radio 190 is serving UEs or other equipment on-board the aircraft 150 via a cabin wireless access point (CWAP) 360, the unified radio 190 could initially be serving the UEs content via the terrestrial network 200 until a certain altitude is reached at which a transition to the ATG network 210 becomes possible and/or advisable. The network monitor 330 may provide network parameters for the terrestrial network 200 and the ATG network 210 to the network selector 340, and the network selector 340 may decide to tune an antenna array of the antenna assembly 328 to switch serving networks to the ATG network 210. The UEs would then receive content from the ATG network 210 instead of via the terrestrial network 200 responsive to the switch.

In an example embodiment, the session manager 350 may be configured to maintain each session that is being provided via the unified radio 190. Thus, for example, one or more sessions that are being maintained with the Internet 115 via the terrestrial network 200 may be transitioned to being maintained via the ATG network 210. The session manager 350 may employ dynamic IP addressing or any other suitable method to maintain the session(s) through the network transition.

Thus, in some example embodiments, the unified radio 190 may employ the network monitor 330, the network selector 340 and/or the session manager 350 to monitor various conditions associated with transitioning between altitude layers in order to manage the available network assets to maximize the quality of the user experience. As such, for example, the unified radio 190 may act as an agile radio that has the capability to switch between multiple radio modalities in an intelligent way. The intelligence could be based on prioritizing networks based on location, altitude, the type of media or data (e.g., the type of service or application) or combinations thereof. Moreover, the intelligence could operate in a real time manner, where measurements are taken in real time and decisions are made contemporaneously (or nearly contemporaneously) with the measurements. However, in some cases, the addition of the planning module 250 may make is possible to implement the intelligence based either entirely or in part on historical information.

As such, the unified radio 190 (particularly via operation of the network selector 340) may employ connectivity assurance during an entire route from takeoff (and before takeoff) to landing (and after landing), so that the entire time communications equipment (e.g., a user device (or UE) or on-board communications equipment) of the aircraft 150 are operational on the aircraft 150, the communications equipment can access (via the CWAP 360 or directly), a network for connectivity purposes. Moreover, the network selector 340 may ensure that the best network (in terms of cost, signal strength, reliability, and/or suitability for a given media type) is made available to the communications equipment at all times. Connectivity assurance may be accomplished by real time channel (e.g., frequency) monitoring to select the best channel at each given altitude band (or at each moment in time). However, as noted above, historical information can also be used to ensure connectivity assurance.

In this regard, the planning module 250 may include historical information regarding measurements made by the network monitor 330 of each unified radio within a system generally employing example embodiments. For example, every aircraft 150 having a unified radio 190 thereon may communicate network parameters and corresponding location information (e.g., latitude/longitude) and altitude information so that a table or other data repository for correlating the network parameters measured for each network at teach respective location and altitude with the time/date of such measurement can be accomplished. Where large capacity for storage is possible, all such data may be stored. However, where smaller capacity for storage is available, the data may be averaged or maintained based on its age (i.e., older data may be expunged to make room for newer data on a circular basis). As such, the planning module 250 may effectively define a 3D picture of the performance achieved by each network at each respective location and altitude over which aircraft have flown during the measurement period(s). Moreover, in some cases, this data may be used to generate a 3D network performance map showing, for each respective network, a rating of network performance that by location and altitude for given times or time ranges.

In some cases, this historical information may be used to, or may include, a designation of a primary network that is to be given top priority for use in each given location and/or altitude band. The planning module 250 may therefore include a listing of primary networks for each location and altitude. In some cases, the planning module 250 may further rank other networks at each respective location and altitude as well, and selection of networks may be made in rank order dependent upon location and altitude and indications of network availability for a currently serving network. For example, an aircraft in a given location may be ascending from the ground to a cruise altitude of 38,000 feet. At the given location, the terrestrial network 200 may be designated as the primary network below 5,000 feet, and the ATG network 210 may be designated as the primary network above 10,000 feet. If the terrestrial base stations at the given location are configured to provide vertically oriented terrestrial network cells 120 with or without vertical beamforming, the terrestrial network 200 may also be designated as the primary network in the gap region between 5,000 feet and 10,000 feet in altitude. However, if the terrestrial base stations at the given location are not configured to include vertically oriented terrestrial network cells 120 with or without vertical beamforming, the satellite network 220 may be designated as the primary network in the gap region unless historical data shows reliable performance for either (or both) of the terrestrial network 200 and the ATG network 210 in the gap region in which case whichever one has the superior network parameters may be designated as the primary network.

In some cases, the unified radio 190 may access (via the planning module 250) the information indicating the primary network for each altitude and location and may select the primary network to be the currently serving network accordingly. If the network monitor 330 makes measurements that enable the network selector 340 to determine that the primary network is either not available, is about to change (e.g., based on a location and/or altitude change), or is experiencing poorer performance than another available option, the network selector 340 may initiate a change to another network (i.e., one of the non-serving networks). The selected non-serving network may then be shifted to become a new currently serving network and the currently serving network before the shift will then transition to be a non-serving network. As noted above, the shift may be made based on the rank order of networks after the primary network using information from the planning module 250. In such an example, the shift will have been made based on historical information that was used to generate the network rank order. However, in other cases, the shift may be made based on more current (even real time) network performance metrics. Thus, the network selector 340 may work based on current information, historical information, or a combination thereof.

Thus, network selection criteria may include rank ordering of networks based on historical performance-related information and/or rank ordering of networks based on current or real-time information. Network selection criteria may also include ranking, scoring, or otherwise comparing network performance characteristics for specific media types in order to ensure, for example, that if media types that are not tolerant to latency are being used, a latency-based criteria can be considered. As such, for example, an indication of latency tolerance associated with the application and service requirements may be used to avoid using the satellite network 220 (or at least rank the satellite network 220 low) when services, applications, prioritized data or media types (e.g., and the data transfer requirements that are associated with respective different media types) are being employed for sessions that are active and those services, applications or media types have a low latency tolerance. In an example embodiment, the network selector 340 may route message traffic via networks based on priority rankings. For example, in some cases, consideration may be given to forward and reverse link capabilities for each respective available network, and such capabilities may be compared to the priority assigned to certain message traffic. The priority could be based on safety or regulatory considerations, or based on subscription service levels in various different embodiments. Application requirements may also impact priority rankings in some cases. Links with a particular network may then be generally maintained until an exceedance event occurs that dictates a network change. Network changes may be made responsive to periods (of any suitable length) of parallel use of channels on the same or different networks in order to maintain continuity.

Cost may also be a consideration employed by the network selector 340 in some cases. For example, the unified radio 190 may have a "home network" in which the unified radio 190 is primarily services and/or maintained. The unified radio 190 may therefore have a subscriber identity module (SIM) card that has been provided by the home network in order to securely store subscriber identity information (e.g., an international mobile subscriber identity (IMSI) number) and corresponding keys that enable identification and authentication of the unified radio 190 as an authorized subscriber for the home network. As such, the SIM card, which may be an integrated circuit specific to the home network, may function as a universal integrated circuit card (UICC) that includes unique information for enabling the unified radio 190 to operate on the home network. The unified radio 190 may also include a SIM card for other networks, which may be considered as "guest networks" where the unified radio 190 can operate, due to the fact that the unified radio 190 has the corresponding SIM cards, and can therefore be identified and authenticated on each respective network. However, it may be the case that the cost of operating on the home network is less than the cost of operating on the guest networks. Thus, the unified radio 190 may prioritize the home network whenever the home network is available (at least above a threshold level of quality or signal strength). When cost is considered by the network selector 340, real time measurements above the threshold level of quality for the home network may trigger a shift to the home network (regardless of which network is otherwise primary in a given location/altitude). However, in other cases, no preference could be given to any network as a home network, or to the home network over a network that is otherwise listed as the primary network for a given location and altitude.

The planning module 250 may, in some cases, be used to define a connectivity assurance plan for a given flight plan, route or trajectory. In this regard, in addition to or as an alternative to defining a primary network for each altitude band and/or location, the planning module 250 may (based on historical information) prescribe or recommend a particular network to be used at every altitude and/or location for the given flight plan, route or trajectory. The connectivity assurance plan may be given to the network selector 340 to cause the network selector 340 to make network selections when location, time or altitude triggers are reached according to the connectivity assurance plan. This may, in some cases, be augmented by real time information (on network performance or availability), or the real time information may simply confirm availability of the networks identified as primary (or to be selected) for any particular portion of the given flight plan, route or trajectory.

Thus, for example, the connectivity assurance plan may define suggested locations at which to achieve a particular altitude (including rates of ascent or descent and when to begin such ascending or descending trajectories) in order maintain optimal connectivity. Moreover, the planning module 250 may be configured to provide guidance (or a warning) regarding connectivity impacts of remaining on a given trajectory. Guidance communications may be provided to the user to advise the user of when connectivity is expected to be restored (is connectivity is lost), or for how long connectivity is expected to be good or sufficient on a given trajectory. In some cases, the guidance communications may be specific to a media type or application being launched, so that the user can understand the likely impact on user experience of continuing on the current trajectory or of the current flight plan. Accordingly, for example, the user may launch a real time connectivity application (such as a video conference or chat application). The planning module 250 may be able to determine, based on the flight path or trajectory, how long this type of application will be supported effectively, and inform the user of the same. As such, if the aircraft 150 is thirty minutes away from an area where the satellite network 220 is the primary network, and will be the primary network for 10 minutes, the planning module 250 may communicate to the user that a period of very high latency (i.e., when the satellite network 220 provides coverage) will be experienced for a 10 minute window starting in about 30 minutes based on the current flight plan. The user or system may manage the decision on engaging in the application accordingly.

In some cases where a particular communication channel or frequency is used for aircraft at a given altitude or altitude band, the communication channel or frequency may be used as a differentiator or method by which to manage or track altitude. For example, if a particular frequency or channel is used at an altitude of 8,000 feet, in a given area, and a different channel or frequency is used at 6,000 feet in the same area, aircraft traveling at the different respective altitudes may be differentiated from each other based on the channel on which they communicate. Connectivity assurance plans may therefore direct aircraft to achieve a given altitude and then switch to the channel corresponding to the altitude. The altitude bands could then be formed as directional corridors so that traffic patterns can be defined based on altitude and direction and may be associated with specific frequencies in accordance with connectivity assurance plans.

The ability of the unified radio 190 to operate effectively may, to some degree, and in some circumstances, depend on the ability of the aircraft 150 (or devices thereon) to determine their location and altitude accurately. Although GPS or GNSS are certainly reliable mechanisms by which to determine the flight path and/or location/altitude of the aircraft 150, other methods may also be employed. For example, area navigation (RNAV) may be employed to continuously determine aircraft position. RNAV navigational performance (RNP-RNAV), which may combine accurate two-dimensional (e.g., LNAV) and three dimensional (e.g., VNAV) positions to determine an accurate position and tracking information for the aircraft 150. ADS-B and PNT (position, navigation and timing) are other examples of mechanisms that may be used for determining altitude and location accurately.

Figure 4:
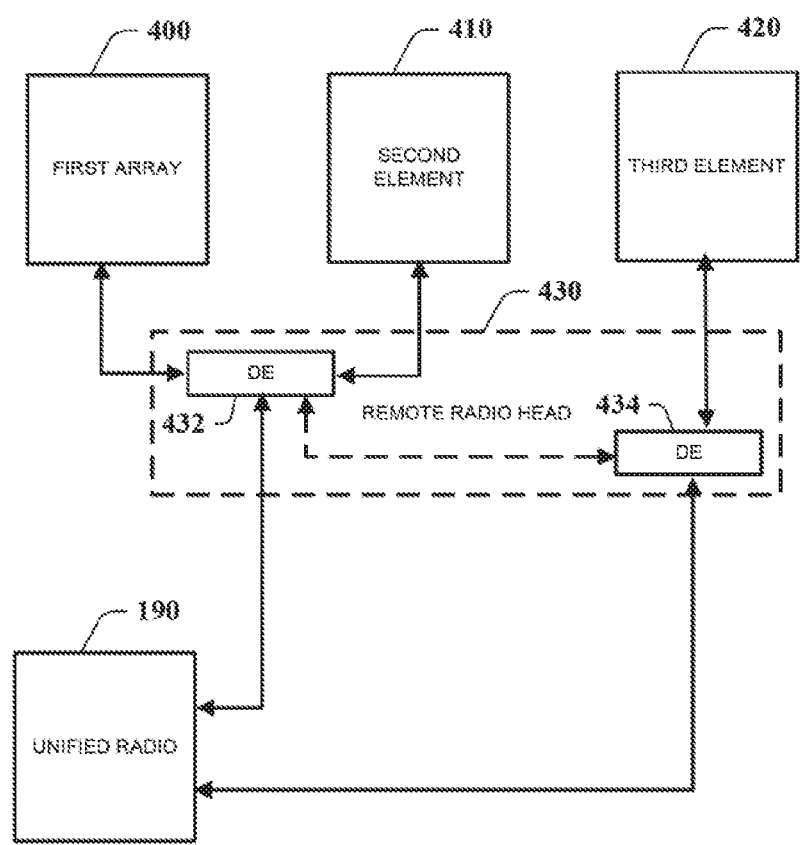
FIG. 4 illustrates a functional block diagram of antenna elements of an example embodiment.

As mentioned above, the unified radio 190 may be configured to operate as a multimodal radio that can intelligently perform network selection based on any or all of location, altitude, network parameters (current and/or historical), cost, and, in some cases, media type. In some cases, the antenna assembly 328 may include one or more antenna arrays that are configurable to enable a respective antenna array to communicate (for monitoring and/or establishment of one or more sessions) with base stations of a corresponding one of the networks. In an example embodiment, the antenna arrays may include one or more arrays configurable as phased arrays to tune to specific selected frequencies and/or to specific selected directions/locations (via either or both horizontal and vertical beamforming) to enable connections to the locations of base stations of one of the networks. However, in other cases, the antenna arrays may include physical antennas or antenna elements that are tuned or otherwise configured specific to respective ones of the networks. FIG. 4 illustrates a block diagram of one such antenna assembly 328. In this regard, the antenna assembly 328 may include a first antenna array 400, which may include one or more antenna elements that may be mechanically and/or electrically steered and/or tuned to configure the first antenna array 400 to connect to terrestrial base stations 100 of the terrestrial network 200. The antenna assembly 328 may further include a second antenna array 410, which may include one or more antenna elements that may be mechanically and/or electrically steered and/or tuned to configure the second antenna array 410 to connect to ATG base stations 130 of the ATG network 220. The antenna assembly 328 may also include a third antenna array 420, which may include one or more antenna elements that may be mechanically and/or electrically steered and/or tuned to configure the third antenna array 420 to connect to satellites 164 of the satellite network 220. In some embodiments, such as for large airframes, the receive elements may optionally each be coupled to a remote radio head 430 via one or multiple cables. However, if no remote radio head is employed, the unified radio 190 itself could perform functions described herein in association with the remote radio head. In some cases, the remote radio head 430 may be distributed in more than one physical location (as shown by distributed elements (DEs) 432 and 434. The remote radio head 430 may then be coupled (e.g., via fiber optic or other cables) to the unified radio 190 at which typical modulation, demodulation and other radio functions are conducted. The transmit element 406 may also be coupled to the base radio 440.

In an example embodiment, the remote radio head 430 may provide for switching among the receive antennas. In examples in which vertical beam steering of the array panels is conducted, four or more cables may be used to connect each of the left side panel element 402 and the right side panel element 404 to the remote radio head 430. The remote radio head 430 may include one or more cavity filters corresponding to the number of antenna outputs provided to the remote radio head 430. In cases in which vertical beam steering is conducted with a mechanical device adjusting the electrical tilt of the arrays, only one cable and cavity filter, bulk acoustic wave (BAW) filter, surface acoustic wave (SAW) filter, circulator or any other suitable filter may be employed for each array. In some cases, the remote radio head 430 could be eliminated and filters, low noise amplifier (LNA) and switching components may be integrated into antenna housings or in other housings proximate to the antennas. Switching components (whether part of or external to the remote radio head 430) would be used to select the best antenna for receipt or transmission of any given signal based on location of the target or source, the signal strength of the base stations, and the level of interference from surrounding base stations. The antenna selection, then, has multiple triggers designed to maximize the signal to interference plus noise ratio.

Figure 5:
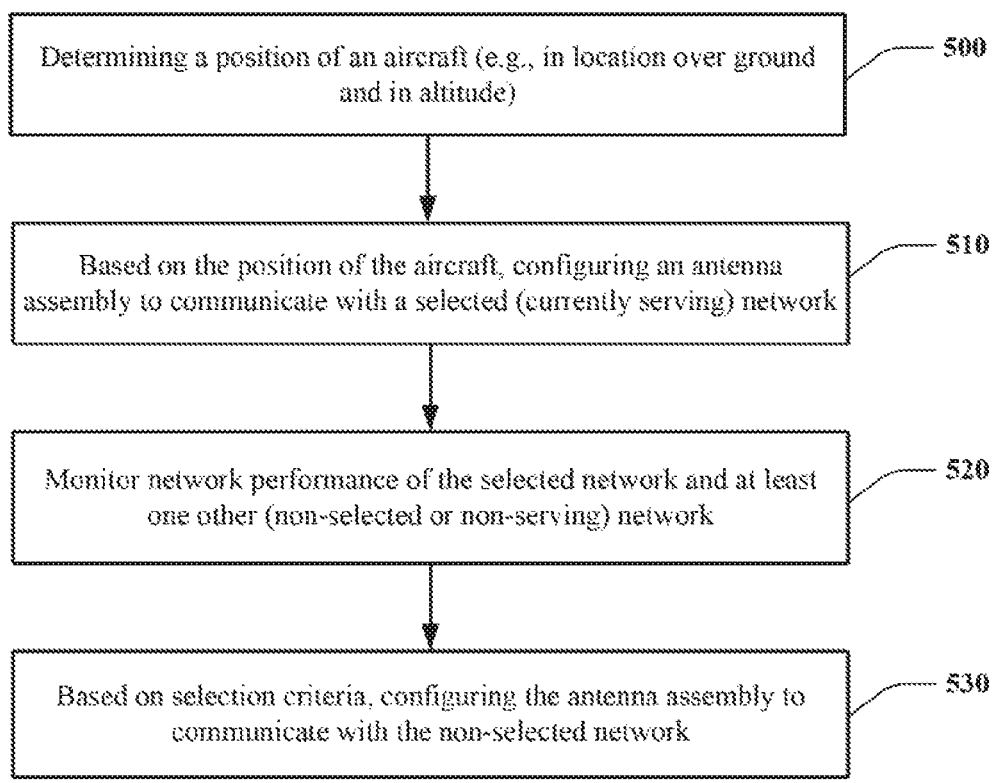
FIG. 5 illustrates a functional block diagram of a method according to an example embodiment.

FIG. 5 illustrates a block diagram of one method that may be associated with an example embodiment as described above. From a technical perspective, the processing circuitry 310 described above may be used to support some or all of the operations described in FIG. 5. As such, the platform described in FIGS. 1-3 may be used to facilitate the implementation of several computer program and/or network communication-based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the processing circuitry 310, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include determining a position of an aircraft (e.g., in location over ground and in altitude) at operation 500. The method may further include configuring an antenna assembly to communicate with a selected (currently serving) network based on the position of the aircraft at operation 510. Network performance of the selected network and at least one other (non-selected or non-serving) network may then be monitored at operation 520. At operation 530, the antenna assembly may be configured to communicate with the non-selected network based on selection criteria (as discussed above).

Thus, in accordance with an example embodiment, a unified radio system for providing wireless communication to a communication device on an aircraft regardless of aircraft altitude may be provided. The unified radio system may include a terrestrial network including a plurality of terrestrial base stations configured to communicate primarily in a ground communication layer below a first altitude, an ATG network including a plurality of ATG base stations configured to communicate primarily in an ATG communication layer above a second altitude, air-to-air relays and an aircraft with an onboard antenna assembly and a unified radio. The unified radio may be configured to monitor network parameters of the terrestrial network and the ATG network and switch between a currently serving network and a non-serving network based on the network parameters.

In some embodiments, the system may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the unified radio may be configured to instruct a switch from the currently serving network to the non-serving network based on altitude of the aircraft. In an example embodiment, the system may further include a planning module defining a primary network based on altitude and location. The unified radio may be configured to instruct the switch from the currently serving network to the non-serving network based on the altitude of the aircraft when the non-serving network is identified as the primary network for a current location of the aircraft. In some cases, the unified radio may be configured to define a primary network in each of a plurality of communication zones including the ground communication layer, the ATG communication layer, and a gap region disposed between the first and second altitudes. In an example embodiment, the unified radio is configured to select the primary network as the currently serving network in each respective one of the ground communication layer, the ATG communication layer, and the gap region. In some cases, the antenna assembly may include an antenna array configured to monitor the non-serving network. In response to network parameters of the non-serving network meeting a network selection criteria, the unified radio may be configured to switch to the non-serving network as a new currently serving network. In an example embodiment, the system may further include a satellite network. The unified radio may be configured to monitor network parameters of each of the terrestrial network, the ATG network and the satellite network. The unified radio may be configured to select one of the terrestrial networks, the ATG network and the satellite network to be a new currently serving network in response to measured network parameters of the non-serving network meeting a network selection criteria relative to measured network parameters of the currently serving network. In some cases, the unified radio may be configured to maintain each session during a switch from the currently serving network to the non-serving network. In an example embodiment, a rate of monitoring the non-serving network may be changed based on or in accordance with a proximity of the aircraft to the first altitude or the second altitude or based on or in accordance with a rate of ascent or descent of the aircraft. In some cases, the unified radio may be configured to monitor network parameters of each of the terrestrial network and the ATG network and monitor application and service requirements associated with sessions supported by the currently serving network. The unified radio may be configured to select a switch to the non-serving network based on both the network parameters and latency tolerance associated with the application and service requirements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A unified radio system for providing wireless communication to a communication device on an aircraft regardless of aircraft altitude, the system comprising:
   a terrestrial network comprising a plurality of terrestrial base stations configured to communicate primarily in a ground communication layer below a first altitude;
   an air-to-ground (ATG) network comprising a plurality of ATG base stations configured to communicate primarily in an ATG communication layer above a second altitude;
   an air-to-air mesh (ATA) network for data relays through connected aircraft, and
   an aircraft with an onboard antenna assembly and a unified radio;
   wherein the unified radio is configured to monitor network parameters of the terrestrial network, the ATG network and the ATA network and switch between a currently serving network and a non-serving network based on the network parameters.

2. The system of claim 1, wherein the unified radio is configured to instruct a switch from the currently serving network to the non-serving network based on altitude of the aircraft.

3. The system of claim 2, further comprising a planning module defining a primary network based on altitude and location, and wherein the unified radio is configured to instruct the switch from the currently serving network to the non-serving network based on the altitude of the aircraft when the non-serving network is identified as the primary network for a current location of the aircraft.

4. The system of claim 1, wherein the unified radio is configured to define a primary network in each of a plurality of communication zones including the ground communication layer, the ATG communication layer, and a gap region disposed between the first and second altitudes.

5. The system of claim 4, wherein the unified radio is configured to select the primary network as the currently serving network in each respective one of the ground communication layer, the ATG communication layer, and the gap region.

6. The system of claim 5, wherein the antenna assembly comprises an antenna array configured to monitor the non-serving network, and wherein, in response to network parameters of the non-serving network meeting a network selection criteria, the unified radio is configured to switch to the non-serving network as a new currently serving network.

7. The system of claim 5, further comprising a satellite network,
wherein the unified radio is configured to monitor network parameters of each of the terrestrial network, the ATG network and the satellite network, and
wherein the unified radio is configured to select one of the terrestrial network, the ATG network and the satellite network to be a new currently serving network in response to measured network parameters of the non-serving network meeting a network selection criteria relative to measured network parameters of the currently serving network.

8. The system of claim 7, wherein a rate of monitoring the non-serving network changes with a rate of ascent or descent of the aircraft.

9. The system of claim 7, wherein a rate of monitoring the non-serving network changes with a proximity of the aircraft to the first altitude or the second altitude.

10. The system of claim 1, wherein the unified radio is configured to maintain each session during a switch from the currently serving network to the non-serving network.

11. The system of claim 1, wherein the unified radio is configured to monitor network parameters of each of the terrestrial network and the ATG network, and monitor application and service requirements associated with sessions supported by the currently serving network, and
wherein the unified radio is configured to select a switch to the non-serving network based on both the network parameters and latency tolerance associated with the application and service requirements.

12. A unified radio for providing wireless communication to a communication device on an aircraft regardless of aircraft altitude, the unified radio comprising:
an antenna assembly configurable to facilitate communication with:
a terrestrial network comprising a plurality of terrestrial base stations configured to communicate primarily in a ground communication layer below a first altitude; and
an air-to-ground (ATG) network comprising a plurality of ATG base stations configured to communicate primarily in an ATG communication layer above a second altitude; and
processing circuitry configured to monitor network parameters of the terrestrial network and the ATG network and switch between a currently serving network and a non-serving network based on the network parameters.

13. The unified radio of claim 12, wherein the processing circuitry is configured to instruct a switch from the currently serving network to the non-serving network based on altitude of the aircraft.

14. The unified radio of claim 13, further comprising a planning module defining a primary network based on altitude and location, and wherein the processing circuitry is configured to instruct the switch from the currently serving network to the non-serving network based on the altitude of the aircraft when the non-serving network is identified as the primary network for a current location of the aircraft.

15. The unified radio of claim 12, wherein the processing circuitry is configured to define a primary network in each of a plurality of communication zones including the ground communication layer, the ATG communication layer, and a gap region disposed between the first and second altitudes.

16. The unified radio of claim 15, wherein the processing circuitry is configured to select the primary network as the currently serving network in each respective one of the ground communication layer, the ATG communication layer, and the gap region.

17. The unified radio of claim 16, wherein the antenna assembly comprises an antenna array configured to monitor the non-serving network, and wherein, in response to network parameters of the non-serving network meeting a network selection criteria, the unified radio is configured to switch to the non-serving network as a new currently serving network.

18. The unified radio of claim 5, wherein the antenna assembly is further configured to communicate with a satellite network,
wherein the processing circuitry is configured to monitor network parameters of each of the terrestrial network, the ATG network and the satellite network, and
wherein the processing circuitry is configured to select one of the terrestrial network, the ATG network and the satellite network to be a new currently serving network in response to measured network parameters of the non-serving network meeting a network selection criteria relative to measured network parameters of the currently serving network.

19. The unified radio of claim 18, wherein a rate of monitoring the non-serving network changes with a rate of ascent or descent of the aircraft or with a proximity of the aircraft to the first altitude or the second altitude.

20. The unified radio of claim 12, wherein the processing circuitry is configured to maintain each session during a switch from the currently serving network to the non-serving network.

21. The unified radio of claim 12, wherein the processing circuitry is configured to monitor network parameters of each of the terrestrial network and the ATG network, and monitor application and service requirements associated with sessions supported by the currently serving network, and
wherein the unified radio is configured to select a switch to the non-serving network based on both the network parameters and latency tolerance associated with the application and service requirements.

* * * * *